Feb. 7, 1961 G. H. SCHURGER 2,970,523
OPERATOR ELEVATOR FOR MACHINE TOOLS
Original Filed May 13, 1954 6 Sheets-Sheet 1

INVENTOR
Garner H. Schurger
by Carlson, Pitzner, Hubbard & Wolfe
ATTORNEY

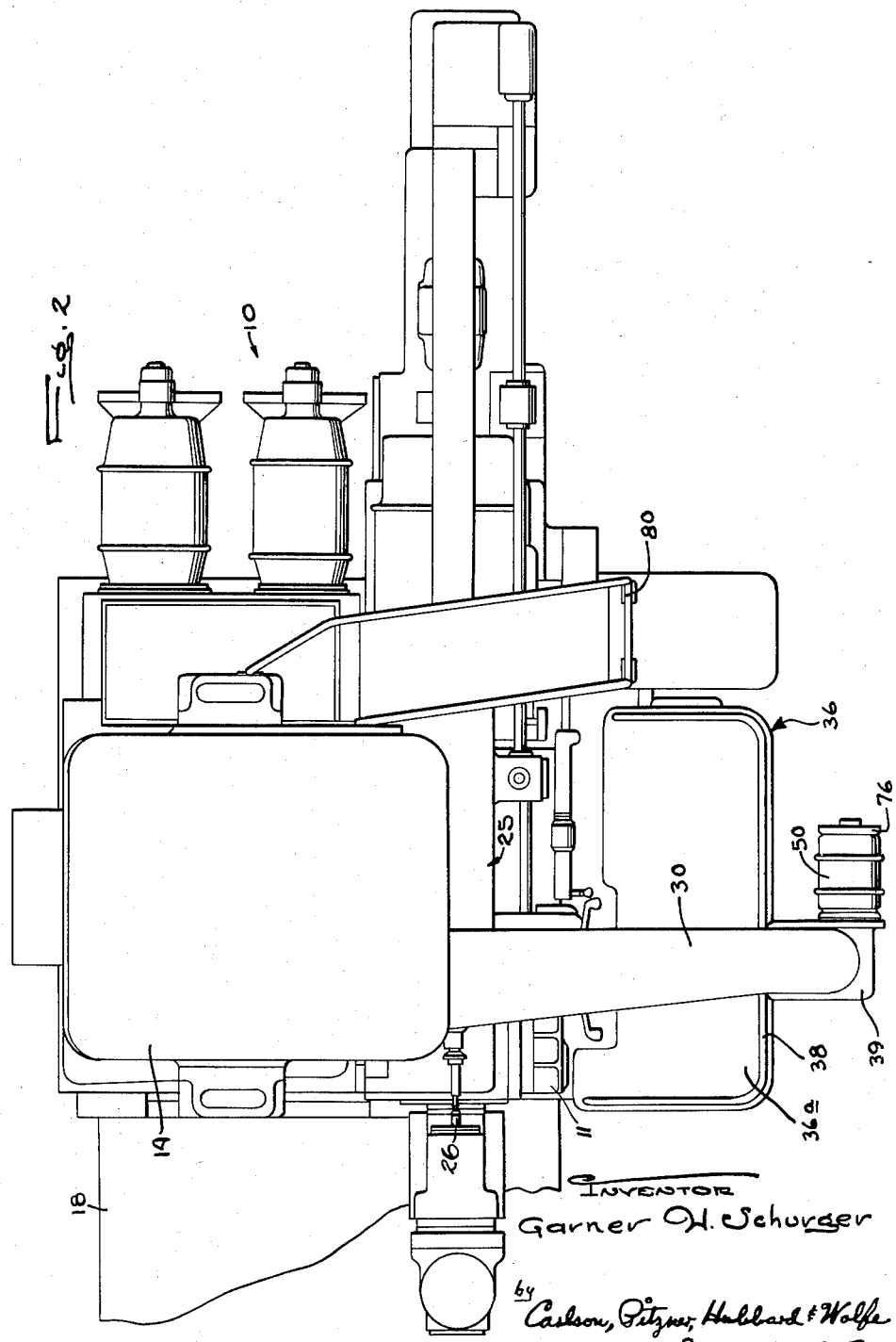

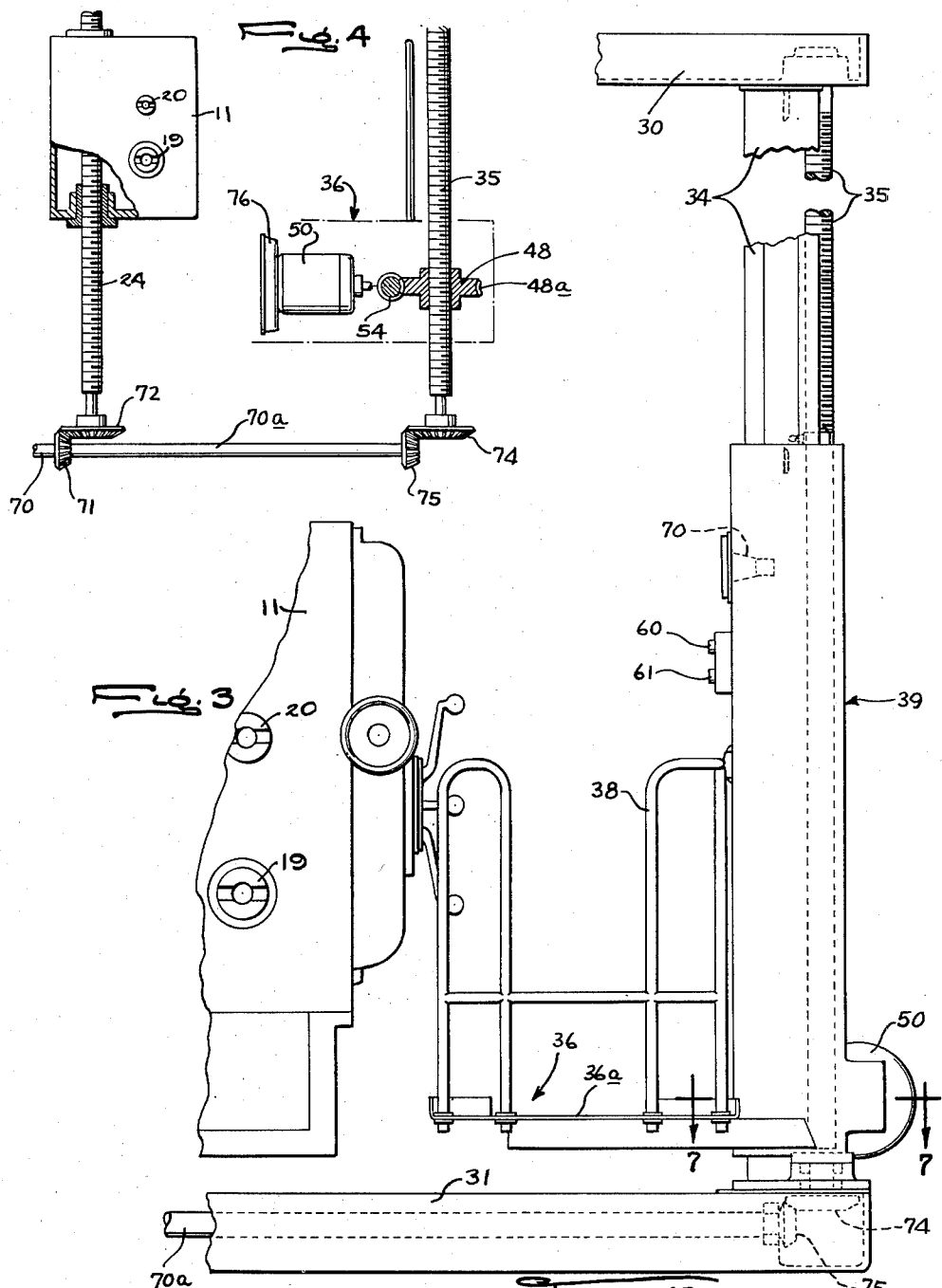

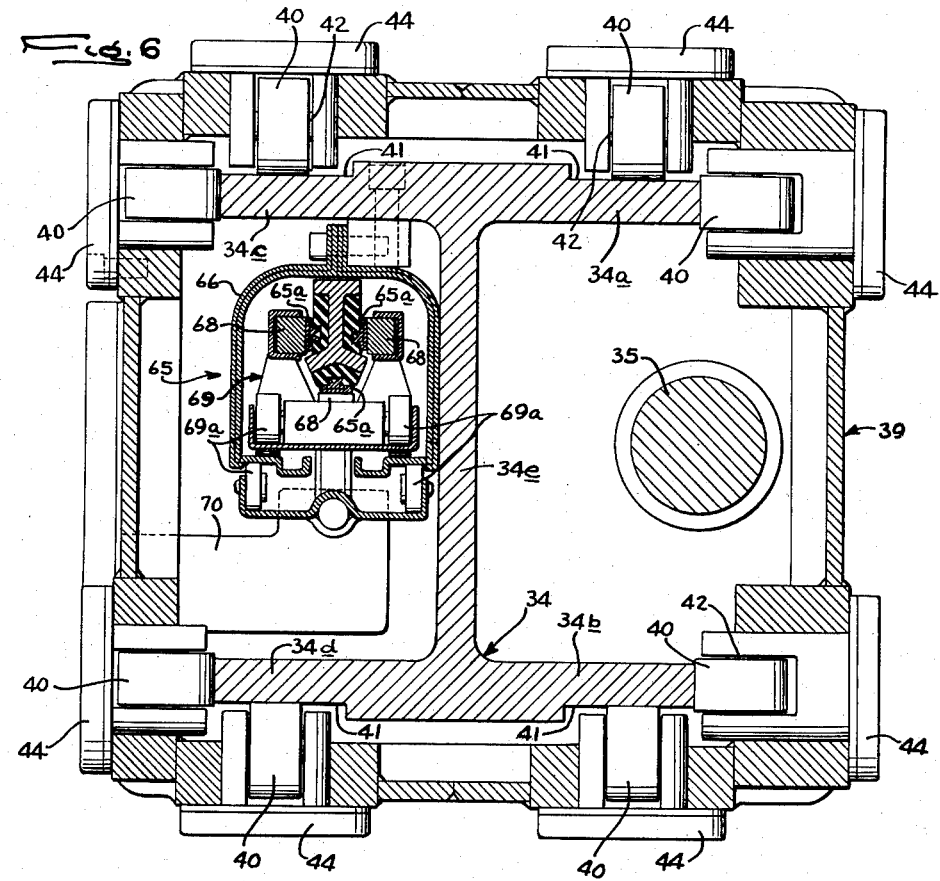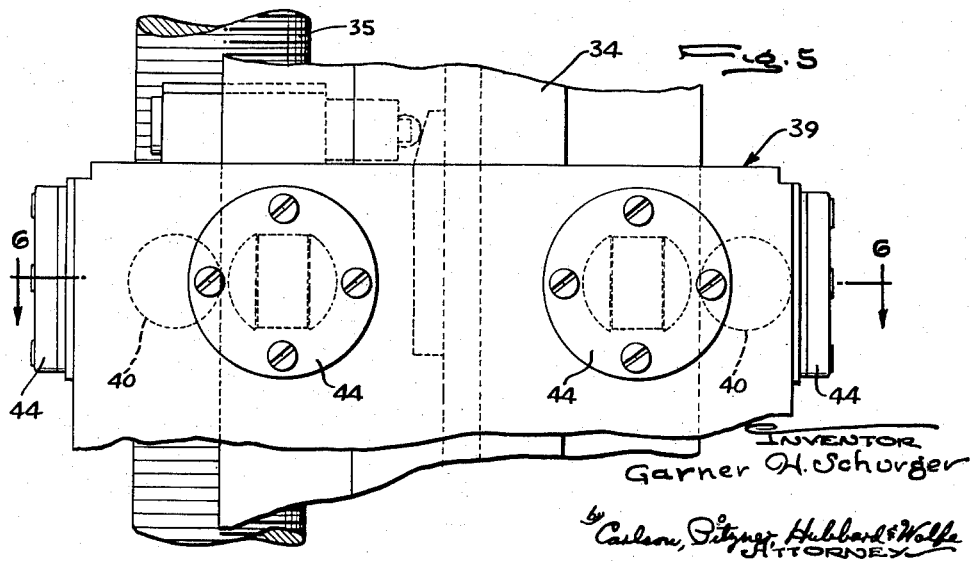

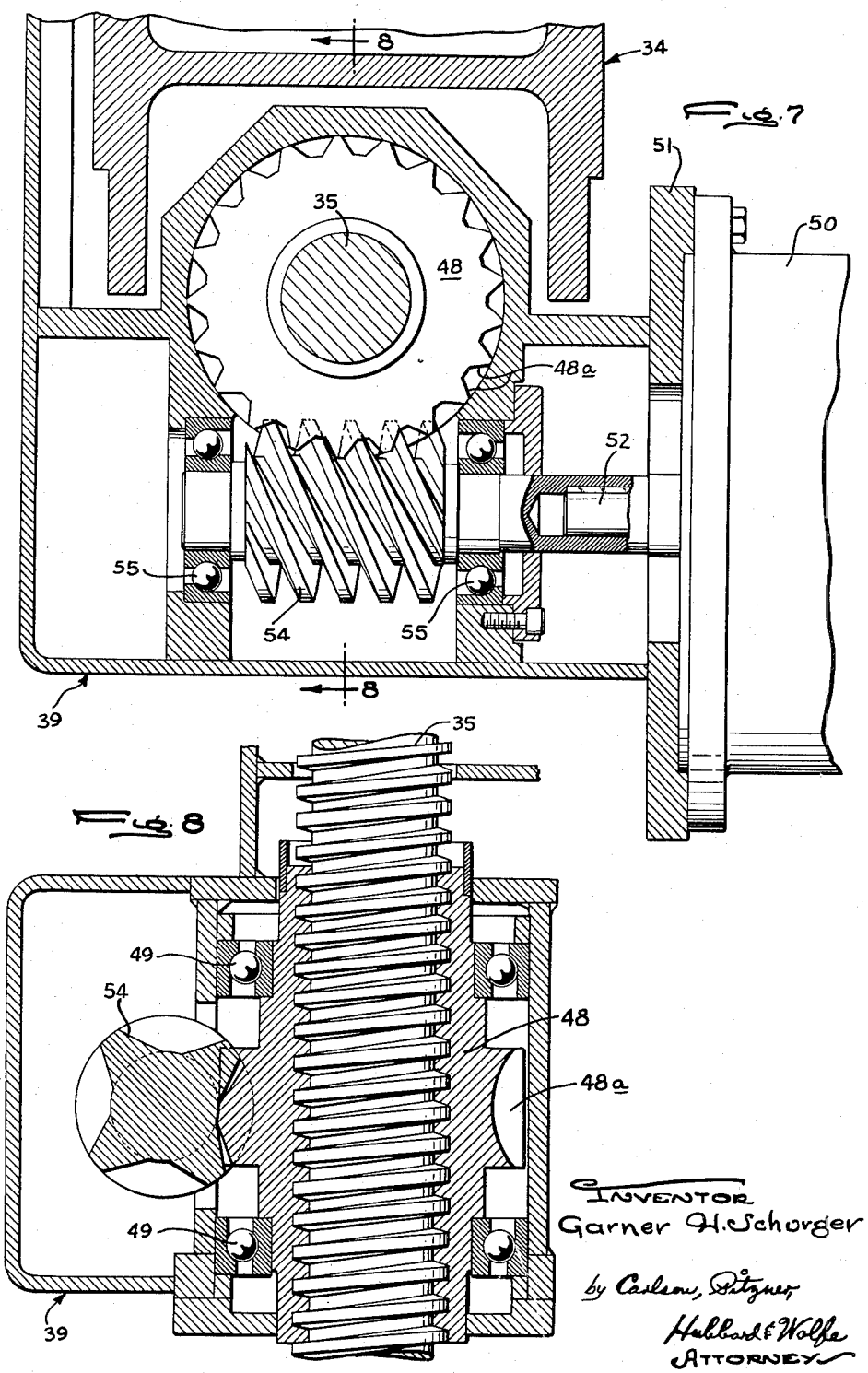

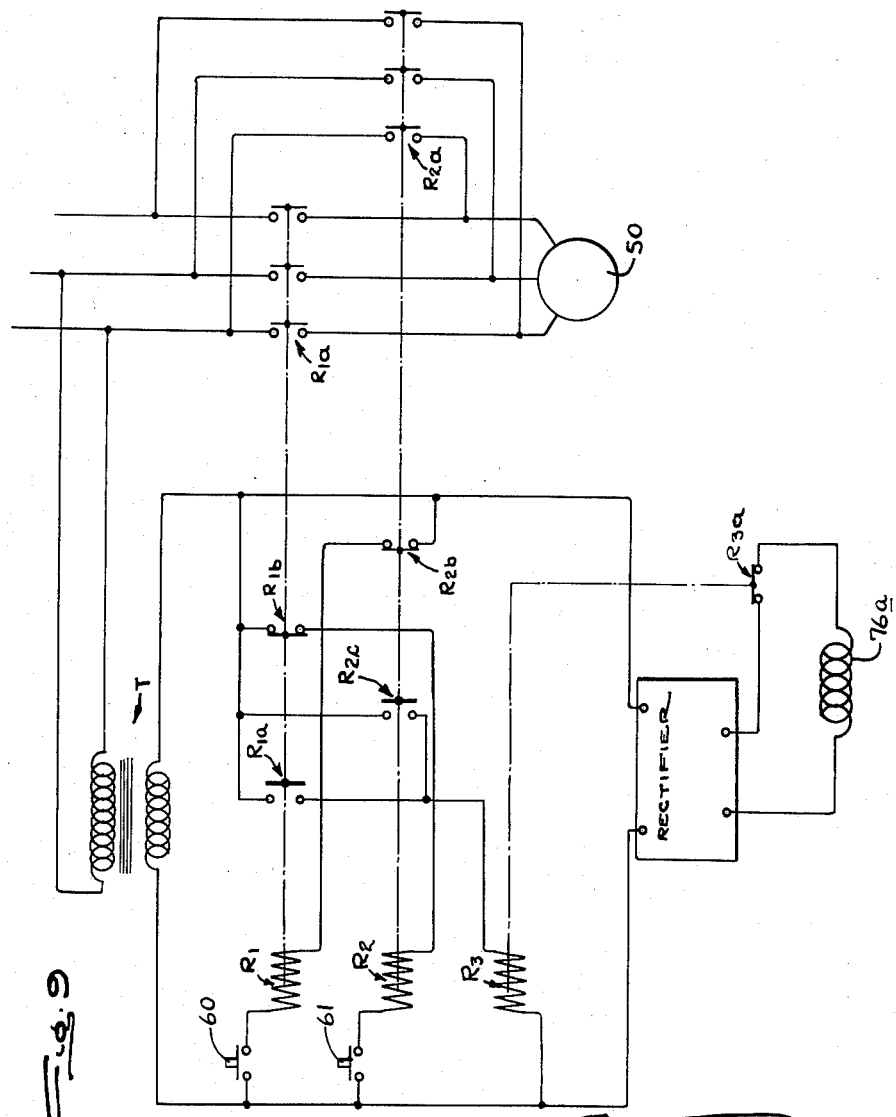

United States Patent Office 2,970,523
Patented Feb. 7, 1961

2,970,523

OPERATOR ELEVATOR FOR MACHINE TOOLS

Garner H. Schurger, Fond du Lac, Wis., assignor to Giddings & Lewis Machine Tool Company, Fond du Lac, Wis., a corporation of Wisconsin Original application May 13, 1954, Ser. No. 429,578, now Patent No. 2,816,485, dated Dec. 17, 1957. Divided and this application Sept. 20, 1957, Ser. No. 685,301

7 Claims. (Cl. 90—11)

The present invention pertains to improvements in machine tools and, more particularly, has to do with large machine tools of relatively large size and great height. This application is a division of applicant's copending application Serial No. 429,578, filed May 13, 1954 (now Patent No. 2,816,485, issued December 17, 1957).

The primary object of the invention is to provide an "elevator" on which the operator of a large machine tool may ride in ascending and descending the vertical distances he must cover in inspecting the progress of the machine work, making adjustments on cutter tools or tracer mechanisms, and changing cutters or control settings. Transport of the operator is not merely a nice convenience but a real, practical need in very large machine tools, for the fatigue brought about by his climbing, twisting, and crawling over the machine may so diminish the operator's keenness of perception and quickness of action as to bring on a serious mistake resulting in damage to the machine itself or ruination of a workpiece into which much machining time and money has already been invested.

Another object of the invention is to provide an "elevator" for the operator of a machine tool, spaced from and movable independently of the machine headstock and spindles so that it can be used to ascend and descend the machine while the headstock remains in a fixed position, and which is relatively simple in structural organization and readily applied to existing machines.

It is a further object to guide and support a vertically movable elevator platform by structural provisions which assure that the operator thereon cannot be injured through accidental contact with adjacent stationary components while the platform is in motion.

Still another object is to provide protection against damage to an elevating member, such as an elevating screw, and to electrical supply busses for the movable platform, by so forming a guiding member that it performs the additional function of protectively embracing those components.

Other objects and advantages will become apparent as the following description proceeds, taken in conjunction with the accompanying drawings, in which:

Fig. 2 is a plan view of the machine shown in Fig. 1;

Fig. 3 is a fragmentary side elevation of the machine headstock, the operator platform, and the elevating means for the latter;

Fig. 4 is a diagrammatic elevational view corresponding to Fig. 3 and showing a combined drive for the machine headstock and operator platform;

Fig. 5 is a fragmentary elevation showing details of the elevator platform guiding means;

Fig. 6 is a horizontal section taken substantially along the lines 6—6 in Fig. 5, and showing in detail the relationship of the platform elevating member, guiding means and electrical supply components;

Fig. 7 is a detail view taken in horizontal section substantially along the line 7—7 in Fig. 3;

Fig. 8 is a detail view taken in vertical section substantially along the line 8—8 in Fig. 7;

Fig. 9 is a schematic wiring diagram of an exemplary control circuit for the operator elevator.

Figure 1:
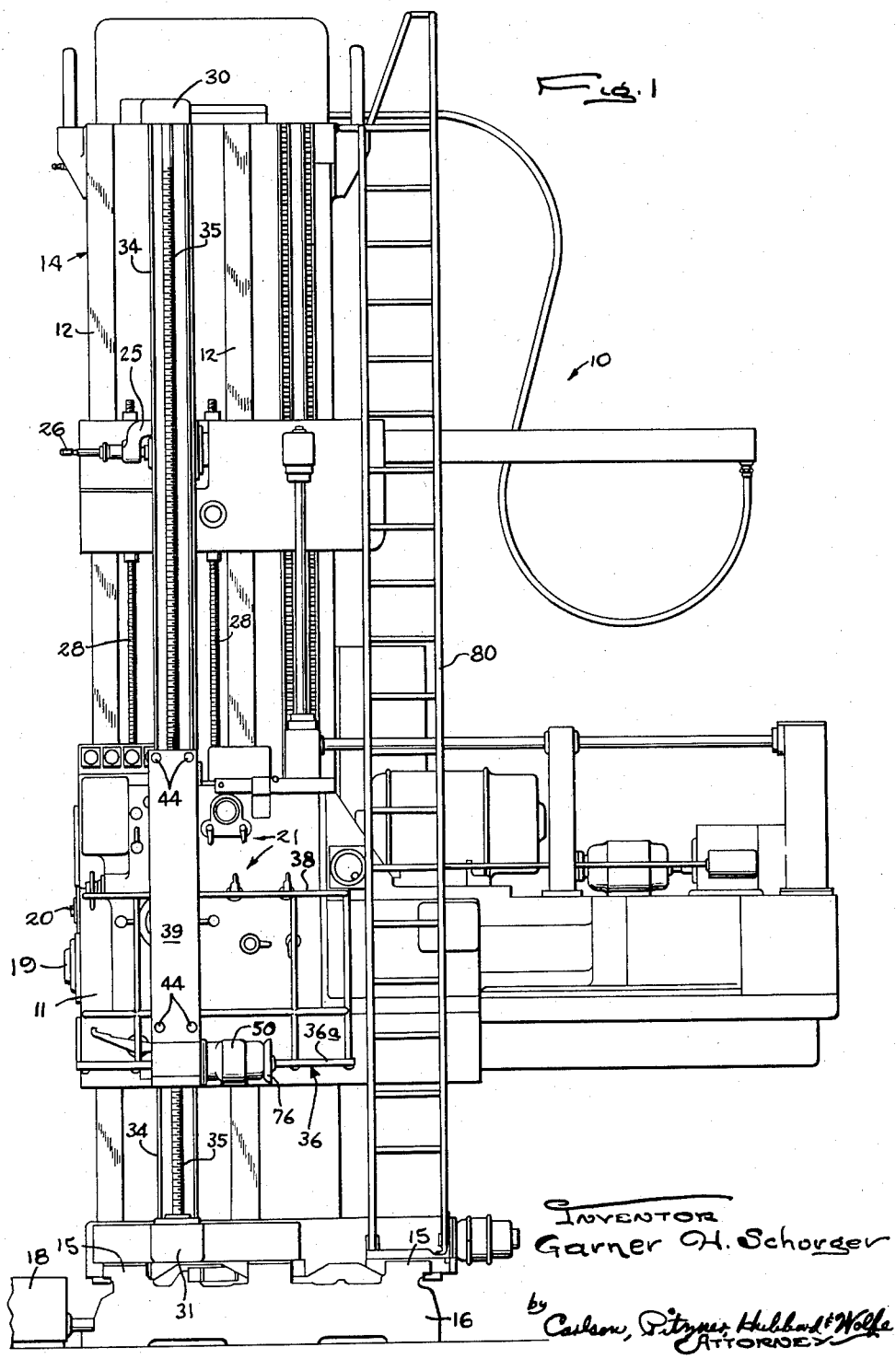
Figure 1 is a front elevation of an exemplary machine tool provided with an operator elevator embodying the features of the present invention.

While the invention has been shown and is described in some detail with reference to the particular embodiment thereof, there is no intention to thereby limit it to such detail. On the contrary, the intention here is to cover all alterations, modifications and equivalents falling within the spirit and scope of the invention as defined by the appended claims.

The machine tool which has been selected to illustrate one application of the invention is a horizontal boring, drilling and milling machine 10 (Figs. 1 and 2) having a vertically movable element or headstock 11 which is translatable along vertical ways 12 carried by an upright column 14. The column 14 is movable along horizontal ways 15 formed on a base 16 from which a work bed 18 (partially shown) extends. Although the details of this particular machine tool are shown only by way of example and such details may vary in practice of the present invention, the headstock 11 may be of the general type disclosed in Gallimore Patent 2,251,015, and may be provided with main and auxiliary horizontal spindles 19 and 20 together with numerous control levers and switches 21. The headstock is raised and lowered along the column 14 by power means driving a vertical elevating screw 24 (Fig. 4) which is journaled in the column 14 and engaged with a threaded member or nut in the headstock itself. As may be perceived from Fig. 1, the column 14 is one which towers to a relatively great height of some thirty feet or more and the headstock by vertical movement sliding along the ways 12 can be located to place the spindles 19, 20 at any desired elevation, as may be required in machining a workpiece which rises considerably above the bed 18.

The machine tool 10 is also equipped with a tracer head 25 having a stylus 26 adapted to follow the contour of a master pattern (not shown) and through appropriate control circuits to cause relative movement between a cutting tool on one of the spindles 19 or 20 and the workpiece (not shown) so that the latter is machined to the same shape as the pattern. The tracer head 25 is mounted on a slide movable along the vertical ways 12 and rigidly attached to the headstock by two tie rods 28. The tracer head thus moves in unison with the headstock vertically along the ways 12, although it is adjustable relative to the headstock by threads and cooperating nuts provided at the upper ends of the tie rods 28.

In accordance with the present invention, a novel structural arrangement has been provided in the illustrated machine which makes it possible for an operator to move safely, swiftly and without physical effort up and down the column 14 to any position where his presence may be required, even though the headstock 11 must remain in a given position during the progress of work, or to preserve its precise location, while the machine is shut down.

To make possible the addition of the operator elevator structure to existing machines and to permit elevation of the operator along the vertical path spaced from but closely adjacent the path of the headstock 11, a pair of extension members or brackets 30 and 31 are rigidly fixed to the upper and lower portions of the column to extend horizontally therefrom. The brackets 30, 31 are thus spaced considerably apart in a vertical direction and permit the elevating means to be supported by the column itself but spaced therefrom. Supported between the extremities of the brackets 30, 31 is a vertically disposed guide beam 34 forming, in effect, a "track" along which an elevating platform may be moved and guided vertically. In the present instance, as shown particularly in Fig. 6, the guide beam 34 is H-shaped in cross section having spaced flanges 34a, 34b, on one side and flanges 34c, 34d on the opposite side of a central web 34e. Such cross-sectional configuration of the guide beam not only gives it greater strength for a given size and weight, but also has another purpose and advantage to be noted below.

To make possible powered vertical movements of an elevator platform, a first elongated elevating member, here shown as an elevating screw 35, is also supported in a vertical position adjacent the machine column 14. Conveniently, the elevating screw 35 is supported at its upper and lower ends by the extremities of the brackets 30, 31. And as shown best in Fig. 6, the screw 35 is so located in the brackets 30, 31 that it is substantially embraced by the flanges 34a, 34b of the guide beam 34. This partial enclosure of the elevating screw 35 by the flanges of the guide beam 34 protects the screw against damage due to foreign objects inadvertently striking it or being caught in its threads.

To support and elevate an operator, an elevator platform 36 having a deck surface 36a is constructed with an appropriate guard railing 38. To locate the platform 36 for vertical movement adjacent the vertical path traversed by the headstock 11, as yet leaving the platform totally disconnected from that headstock, the platform is provided with an integral or rigidly fixed housing 39 which has firm sliding or rolling engagement with the beam 34 to guide the platform vertically therealong. As shown best in Fig. 3, the housing 39 is disposed at the right edge of the platform 36, so that the platform deck surface 36a is located between the guide beam 34 and the column 14 which carries the headstock 11 and so that an operator standing on the platform can easily reach and manipulate the control instrumentalities 21 on the headstock.

In accordance with one feature of the present invention, the housing 39 is formed and disposed to surround or embrace the elevating screw 35 and the guide beam 34. The housing is made of considerable height, that is, so that it extends above the deck surface 36a a distance approximately equal to the height of an operator. By this provision, the housing 39 performs a second and very important function in that it absolutely prevents the operator, or his clothing, from accidental contact with the guide beam or the elevating screw while the platform is being raised or lowered relative thereto. Thus, all possibility of injury to the operator, as by catching of his clothing in the screw 35 or crushing of his hand or foot between the guide beam and the platform, is precluded. The operator can move freely about the platform without having to worry about accidental contact with the screw 35 and beam 34 while the platform 36 is in motion.

For firm, sliding engagement with the guide beam 34, the upper end of the housing 39 is equipped with eight rollers 40, four of which engage the edges of the four respective flanges of the beam 34, and four of which ride in recessed portions 41 defined in the outer faces of such flanges. A similar set of rollers may be located at the lower end of the housing 39 and engaged with the guide beam 34. By this arrangement, the housing 36 is maintained in alinement with the guide beam 34, yet has freedom for smooth vertical movement along that beam.

Preferably, as illustrated in Fig. 6, the rollers 40 are journaled on pins 42 inserted through spaced jaws of plugs having cap flanges 44. The plugs are insertable through suitably located apertures in the sides of the housing 39 and may be locked in place by screws as shown in Fig. 5. This permits replacement of rollers 40 and plugs should an undue amount of wear occur on them; or alternatively, the take-up of such wear by the removal of shims originally located beneath the cap flanges 44.

For cooperating with the elevating screw 35 to move the platform 36 vertically, a second elevating member is carried by the housing 39. As here shown best in Figs. 4, 7 and 8, the second elevating member takes the form of a nut 48 supported in a part of the platform housing 39 and engaged with the threads of the elevating screw 35. Relative rotation of the elevating screw 35 and nut 48 will produce vertical movement of the entire platform 36, the direction of movement being determined by the direction of such relative rotation. In the present instance, the nut 44 is journaled in the lower end of the housing 39 by two sets of antifriction bearings 49 (Fig. 8), and power means in the form of a reversible electric motor 50 are drivingly connected to rotate the nut in either direction relative to the screw 35. The motor 50 is bolted to a flange 51 (Fig. 7) integral with the platform housing 39, having its shaft 52 keyed or socketed to the shank of a worm 54 which is journaled by suitable antifriction bearings 55. The worm 54 meshes with worm wheel teeth 48a formed integrally on the external periphery of the nut 48.

When the motor 50 is energized to rotate its shaft 52 in either direction, therefore, the worm 54 will, with appropriate speed reduction, drivingly rotate the nut 48 so that the latter advances in one direction or the other along the stationary elevating screw 35 and correspondingly changes the level of the platform 36.

The elevating power motor 50 may, of course, take a variety of forms, and may be associated with appropriate controls so that it can be energized or deenergized to raise or lower the platform according to the desires of the operator. In keeping with one feature of the invention, controls for the motor, here shown as an "up" pushbutton switch 60 and a "down" pushbutton switch 61 (Fig. 3), are provided and made movable with the platform so that they will always be accessible to an operator thereon. For this purpose, the control pushbuttons 60 and 61 are mounted on the inner face of the housing 39 at an appropriate height above the deck 36a so that an operator can easily reach them and actuate them to energize the motor 50 for upward or downward motion of the platform 36.

Because the motor 50 and the pushbutton controls 60, 61 therefor are moved with the platform as it ascends and descends along the guide beam 34, some special provision must be made to supply electric power to those components. For this purpose, stationary electrical busses and sliding contacts are mounted respectively on the guide beam 34 and the housing 39. As shown more particularly in Fig. 6, a three phase stationary vertical bus 65 is rigidly mounted between, and protectively embraced by the flanges 34c, 34d of the guide beam 34. The bus 65 includes three contact strips 65a suitably mounted in strips of insulating material disposed within a protective casing 66. They are engaged by sliding contacts 68 which are rigidly fastened to and move with the housing 39. In the specific structure here illustrated, the sliding contacts 68 are mounted in a carrier 69 which is supported by a hollow arm 70 rigidly fastened to and projecting inwardly from the platform housing 39. The necessary wiring (not shown) leading to the motor 50, the control pushbuttons 60, 61 (and an electric brake to be described) may be passed through the arm 70. The carrier 69 extends through a slot in the casing 66 and has rollers 69a riding on opposite sides of the casing to provide smooth sliding engagement.

While the specific details of the drive connections and controls here illustrated in the present drawings form no part of the invention here claimed, but rather constitute the separate invention claimed in the above-mentioned copending application Serial No. 429,578 (now Patent No.

2,816,485, they will be briefly described here for the sake of completeness.

As previously mentioned, the headstock 11 is movable vertically along the machine column 14 in response to a rotation of the headstock screw 24 (Fig. 4). This screw may be rotationally driven in either direction from a suitable motor (not shown) acting on a power shaft 70 and through mating bevel gears 71, 72. In order to effect automatic movement of the operator platform 36 in unison with any movement of the headstock 11, the platform elevating screw 35 is journaled at its upper and lower ends in the extremities of the horizontally projecting brackets 30, 31. At its lower end, the screw 35 is equipped with a bevel gear 74 mating with a similar gear 75 fast on the end of an extension shaft 70a which projects through the hollow, lower bracket 31 (Fig. 3). Thus, so long as the nut 48 carried by the platform 36 is prevented from rotating, rotation of the power shaft 70 and both the elevating screws 24 and 35 will cause simultaneous upward or downward movement with the headstock 11 and the platform 36 in unison.

In order to positively lock the nut 48 against rotation, an electric brake 76 is employed as shown schematically in Fig. 4, being connected with one end of the shaft for the motor 50. Thus, with the motor 50 deenergized and brake 76 applied, the motor shaft 52, the worm 54, the worm wheel teeth 48a, and the nut 48 are held stationary.

With this arrangement it is possible to move the headstock 11 and the elevator platform in unison so that the operator on the platform maintains his position relative to the control instrumentalities 21 on the face of the headstock. However, in many instances the operator will desire to move up or down on the machine while leaving the headstock in a given position. And to effect this, all he need do is to deenergize the electric brake 76 and energize the motor 50 in order to rotate the nut 48 relative to the stationary elevating screw 35. One form of electric control circuitry for carrying out the above operations is illustrated schematically in Fig. 9. The motor 50 is there shown as a three-phase A.C. induction motor connected for energization from a suitable three-phase voltage source through either of two sets of relay contacts R1a and R2a respectively. It will be apparent that the motor 50 runs in one direction or the other, thereby raising or lowering the operator platform 36, depending upon which set of those contacts is closed. The contacts R1a and R2a are controlled respectively by relay coils R1 and R2, the latter being connected in series respectively with the "up" and "down" pushbutton switches 60 and 61 across a single phase circuit supplied through a transformer T. Normally closed contacts R2b and R1b controlled by the respective relay coils R2 and R1 are connected in series with the coils R1 and R2 respectively, thereby assuring that both the contacts R1a and R2a cannot be simultaneously closed.

A brake coil 76a for the electric brake 76 is supplied with direct current through a rectifier and normally closed contacts R3a of a control relay. The latter relay includes a coil R3 which is connected in series with the parallel combination of contacts R1c and R2c, respectively controlled by the coils R1 and R2. Normally, the coil R3 is deenergized and the contacts R3a are closed to energize the brake coil 76a, thus locking the nut 48 against rotation relative to the platform 36 and the housing 39 rigid therewith. Driving of the lead screw 24 and 35 will thus cause the headstock 11 and the platform 36 to be raised or lowered in unison. When the operator desires to move the platform 36 independently of the headstock, he simply presses either of the pushbutton switches 60 or 61, which are conveniently located on the housing 39, and thus causes energization of either the relay coil R1 or the relay coil R2 (Fig. 9). As a result, either the contacts R1a or the contacts R2a will be closed to energize the motor 50 and cause it to drive the nut 48 in the desired direction, advancing the platform 36 upwardly or downwardly relative to the elevating screw 35. Also, whenever either of the pushbutton switches 60 or 61 is actuated and either of the relay coils R1 or R2 energized, one set of the contacts R1c or R2c will be closed, thus energizing the relay coil R3 and opening the contacts R3a. Therefore, the brake coil 76a will be deenergized and the electric brake 76 released automatically whenever the motor 50 is energized.

By virtue of present structural arrangement, therefore, the operator of a large machine tool is provided with power means for transporting him upwardly or downwardly to any desired position. He may move independently of the headstock on the elevator platform 36 by appropriately actuating the controls 60, 61 which move with the platform and are always accessible to him. Because the housing 39 rigid with the platform extends considerably above the deck surface 36a and encloses or embraces both the guide beam 34 and the elevating screw 35, the operator is immune from injury through accidental contact with either the guide beam or the elevating screw while the platform 36 is in motion. Thus, besides performing its primary function of rigidly guiding the platform along the beam 34, the housing 39 performs a second and very important function in protecting the operator from possible injury. By the structural arrangement described, a highly convenient power-driven elevator for the operator is achieved, through the use of components which are relatively simple and inexpensive and which can be readily attached to the columns of existing machine tools.

There has been illustrated in Fig. 1 a ladder 80 permanently fixed to the column 14. This is shown simply because such ladder was necessary and pre-existing on the machine tool before it was equipped with the power elevator here described. The present invention totally eliminates the need for the operator to climb that ladder, and removes the danger and fatigue associated with such climbing. The ladder 80 shown in Fig. 1 is thus used only in those unusual instances when all electrical power has been shut off from the machine and it is necessary for some reason to gain access to the upper portions of the column.

I claim as my invention:

1. In a machine tool having a column and a headstock vertically movable along the column, the combination comprising upper and lower brackets projecting horizontally from the top and bottom of the column, a vertical guide rail fixed between the extremities of said brackets, a horizontal operator's platform having a vertical housing rigid therewith and slidably surrounding said guide rail, and means for moving said platform vertically along said rail on a path adjacent that traveled by the machine headstock.

2. In a machine tool having an upright column and a headstock vertically movable along the column, an elevator support for an operator comprising, in combination, a pair of brackets rigidly fixed to the top and bottom portions of the column and extending horizontally therefrom, a guide beam supported in a vertical position between the extremities of said brackets, an elevating screw supported by the extremities of said brackets closely adjacent to said beam, a platform having a deck surface adapted to carry an operator, a nut rotatably carried by said platform and engaged with said screw, a reversible motor carried by said platform and drivingly connected with said nut to raise and lower said platform, electric supply buses on said guide beam and connected with said motor through slidable contacts carried by said platform, and a hollow, tubular housing rigid with said platform and extending above the deck surface thereof in surrounding relation to said guide beam, elevating screw, and supply buses to preclude injurious contact of an operator with any of them, and a plurality of rollers attached to said housing and engaging said guide beam to hold the latter in a vertical path of movement and spaced from the machine headstock.

3. In a machine tool having an upright column and a headstock movable vertically along the column, an elevator support for an operator comprising, in combination, bracket members rigidly fixed to the top and bottom portions of the column and projecting horizontally therefrom, a first elongated elevating member vertically disposed in a position adjacent the column and supported at its upper and lower ends in the extremities of said brackets, a platform adapted to carry an operator, means for supporting and guiding said platform along a vertical path spaced from the headstock and between said brackets, a second elevating member carried by said platform and engaged with said first member, power means for operating on said elevating members to selectively raise and lower said platform, and controls for said power means movable with said platform and accessible to an operator thereon.

4. In a machine tool having an upright column and a headstock movable vertically along the column, an elevator support for an operator comprising, in combination, bracket members rigidly fixed to the top and bottom of the column and projecting horizontally therefrom, a lead screw held in a vertical position adjacent the column and supported at its upper and lower ends by the extremities of said brackets, a platform adapted to carry an operator, means for guiding said platform for vertical movement independently of the headstock and between said brackets, a nut carried by said platform and engaged with said screw, power means for effecting relative rotation of said nut and screw in selectively opposite directions to raise and lower said platform, and control means movable with said platform and accessible to an operator thereon for operating said power means.

5. In a machine tool having an upright column and a headstock vertically movable along the column, an elevator support for an operator comprising, in combination, two bracket members rigidly fixed to the top and bottom portions of the column and extending horizontally therefrom, a first elongated elevating member vertically disposed adjacent the column and supported by the extremities of said bracket members, a guide beam having spaced flanges, means connecting the upper and lower ends of said guide beam to the extremities of said brackets to hold the beam in a vertical position with said flanges protectively embracing said first elevating member, a platform adapted to carry an operator, means rigid with said platform for engaging said guide beam to guide the platform for vertical movement and to hold the platform free of and spaced from the headstock, a second elevating member carried by said platform and engaged with said first member, power means for relatively moving said first and second members and selectively effecting raising and lowering of said platform, and controls movable with said platform and accessible to an operator thereon for operating said power means.

6. In a machine tool having a column and a headstock vertically movable along the column, the combination comprising upper and lower brackets projecting horizontally from the top and bottom of the column, a vertical elevating screw supported between the extremities of said brackets, a horizontal operator's platform, a nut carried by said platform and engaged with said screw, power means for relatively rotating said nut and screw to move said platform vertically along a path adjacent that traveled by the machine headstock, and a vertical housing fixed to and extending upwardly from said platform in totally surrounding relation to said screw, so that said housing prevents injurious contact of an operator with said screw while the platform is in motion.

7. In a machine tool having a column and a headstock vertically movable along the column, the combination comprising upper and lower brackets projecting horizontally from the top and bottom of the column, a vertical guide beam fixed to and supported between the extremities of said brackets, a vertical elevating screw supported closely adjacent said guide beam, a horizontal operator's platform, a nut carried by said platform and engaged with said screw, power means for relatively rotating said nut and screw to move said platform vertically along a path adjacent that traveled by the machine headstock, and a vertical housing fixed to and extending upwardly from said platform, said housing being hollow and totally surrounding both said guide beam and said screw to protect an operator from injurious contact from both of the latter, and said housing having means engaging said guide beam to guide the platform vertically along the beam.

References Cited in the file of this patent

UNITED STATES PATENTS

| | | |
|---|---|---|
| 1,968,255 | Lewis et al. | July 31, 1934 |
| 2,251,015 | Gallimore | July 29, 1941 |
| 2,263,404 | Armitage et al. | Nov. 18, 1941 |
| 2,393,696 | Kraut et al. | Jan. 29, 1946 |
| 2,430,179 | Lanchester | Nov. 4, 1947 |
| 2,527,897 | Todd | Oct. 31, 1950 |
| 2,681,717 | Spurgeon | June 22, 1954 |
| 2,716,675 | Hoelscher | Aug. 30, 1955 |
| 2,816,485 | Schurger | Dec. 17, 1957 |